United States Patent
Funnell et al.

(10) Patent No.: US 7,184,760 B2
(45) Date of Patent: Feb. 27, 2007

(54) AIR INTERFACE MANAGEMENT IN MOBILE COMMUNICATIONS

(75) Inventors: Nicola M. Funnell, Birmigham (GB); Gjalt de Jong, Leuven (BE)

(73) Assignee: M-Stack Limited, Birmingham (GB)

( * ) Notice: Subject to any disclaimer, the term of this patent is extended or adjusted under 35 U.S.C. 154(b) by 86 days.

(21) Appl. No.: 11/025,777

(22) Filed: Dec. 29, 2004

(65) Prior Publication Data

US 2006/0141999 A1    Jun. 29, 2006

(51) Int. Cl.
*H04Q 7/20* (2006.01)
(52) U.S. Cl. .................. 455/423; 455/449; 455/436; 455/67.11; 370/331; 370/332
(58) Field of Classification Search ............. 455/423, 455/449, 436, 67.11; 370/332, 331
See application file for complete search history.

(56) References Cited

U.S. PATENT DOCUMENTS

| | | | |
|---|---|---|---|
| 6,445,917 B1 * | 9/2002 | Bark et al. | 455/423 |
| 6,516,192 B1 * | 2/2003 | Spaur et al. | 455/450 |
| 2003/0125057 A1 * | 7/2003 | Pesola | 455/502 |
| 2005/0048972 A1 * | 3/2005 | Dorenbosch et al. | 455/436 |
| 2005/0070283 A1 * | 3/2005 | Hashimoto et al. | 455/435.1 |
| 2005/0143062 A1 * | 6/2005 | Dowling | 455/423 |

* cited by examiner

*Primary Examiner*—Danh Cong Le (57) ABSTRACT

Air interface management apparatus for use in network-based control of measurements made by mobile user equipment with respect to cells of the network is adapted to detect conflict in content of measurement control messages instructing the report of pathloss measurement values. Conflict is detected in particular where the message specifies:
a) an identity for a triggering event for which the category or categories of cell to be measured is determined at the receiver solely by said identity and comprises detected set cells, or
b) periodical measurement in respect of a detected set cell.

Pathloss measurements are not possible in these cases. The apparatus provides a mechanism for dealing with detected conflict by blocking transmission of, or response to, a measurement control message giving rise to conflict. Alternatively, the message or the response may be modified to avoid the conflict.

17 Claims, 5 Drawing Sheets

AIR INTERFACE MANAGEMENT IN MOBILE COMMUNICATIONS

The present invention relates to air interface management in mobile communications. It finds particular application in the management of measurements made by mobile equipment in relation to the air interface.

Mobile communications provides an access technology for portable user equipment ("UE") to gain access to networks without having to use a wired connection. In today's environment, the UE communicates over a radio link to one or more network access points, often but not always those geographically nearest. One or more networks are available via the access points and these networks may be either wireless or fixed line. Wireless networks of this type are often described as "cellular", each access point defining a cell of the wireless network. When the UE moves, it may cross a cell boundary in which case there is a change in the network access point(s) supporting communication between the UE and the network.

An area in which considerable work has been done is in development of UMTS ("Universal Mobile Telecommunications System") technology. The UMTS network architecture can be viewed as two primary parts, the UTRAN ("UMTS Terrestrial Radio Access Network") and the core network. The UTRAN looks after the physical aspects of providing wireless access for a mobile UE to the core network and the core network provides switching. To use a UMTS network, the UE itself must be compatible and therefore includes in its operating environment protocols to support that wireless access.

Figure 1:
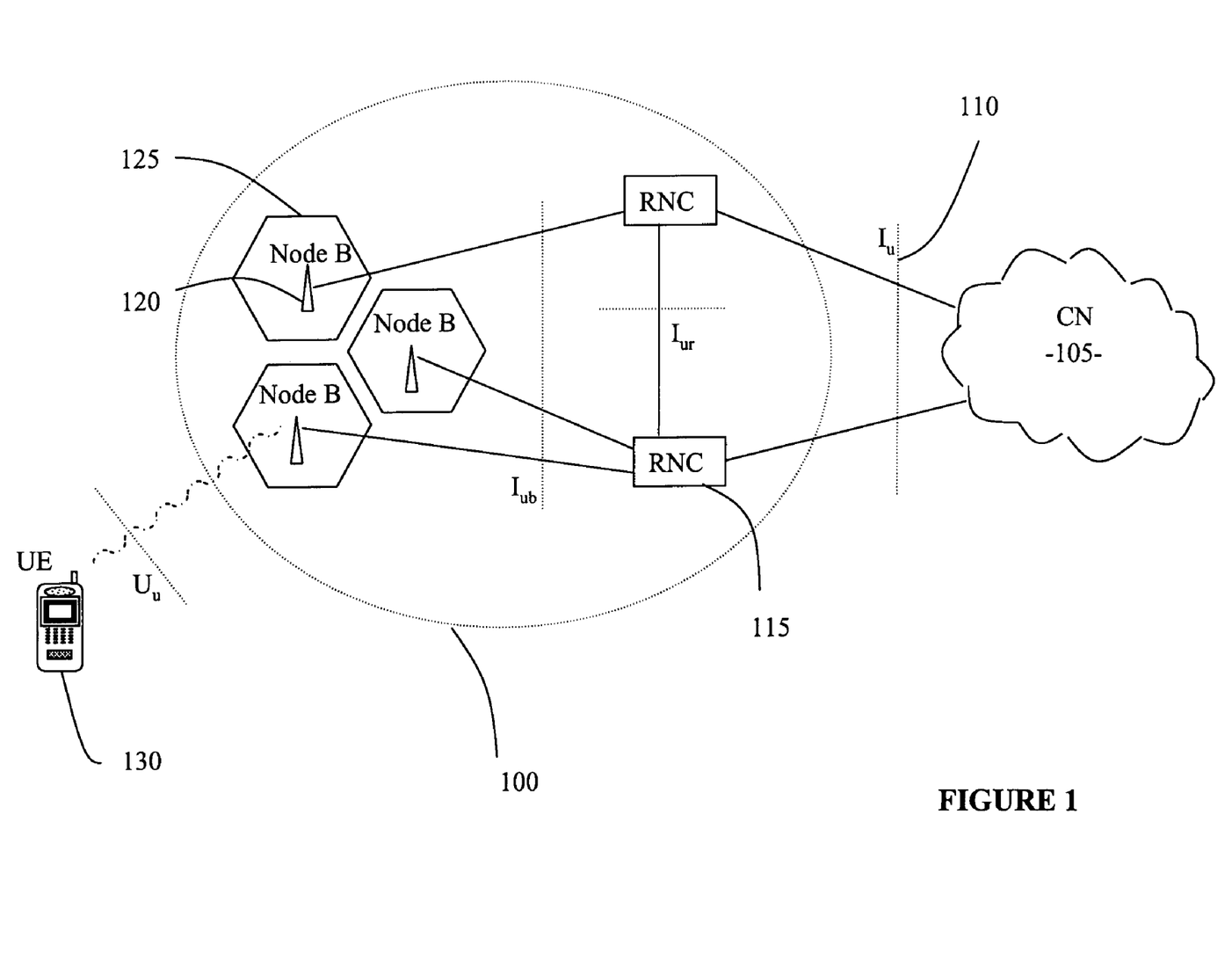
FIG. 1 shows a schematic block diagram of a UMTS cellular network supporting user equipment in which the air interface management apparatus might be applied.

Referring to FIG. 1, the UTRAN is made up of a set of RNSs ("Radio Network Subsystems"). Each RNS comprises one RNC ("Radio Network Controller") and one or more logical nodes known as "Node Bs". Each Node B is a network access point and its associated RNC generally controls the radio resources for providing wireless access across the air interface between a UE and the UTRAN, using the Node B.

Many protocols have been written in the course of mobile communications development. Many of these are used in the core network mentioned above. In order to use the core network, UMTS networks must be equipped with the relevant protocols demanded by the core network interface. However, the main thrust of today's UMTS networks lies in the UTRAN and its protocols to deal with the various radio/air interfaces between the RNCs, the Node Bs and the UEs. In a UMTS network, protocol stacks are used in each of the RNCs, the Node Bs and the UEs. One of these protocols is the Radio Resource Control ("RRC") protocol, present in the RNC and the UE.

One of the groups working on UMTS standards is the 3$^{rd}$ Generation Partnership Project ("3GPP"). An example of a technical specification published on the Internet by 3GPP that is relevant to embodiments of the present invention is as follows:

TS 25.331 (version 6.3.0)

entitled "Technical Specification Group Radio Access Network; Radio Resource Control (RRC); Protocol Specification".

The RRC protocol provides a number of services in supporting the radio/air interfaces. In order to manage connectivity, the UTRAN requires a UE to perform various measurements in relation to cells, and to report measurement results back to the UTRAN. This is required for various aspects of radio resource management in the UTRAN, such as to define and/or modify the set of active cells to which a UE should have a radio link. A list of RRC services is set out in Section 5.1 of TS 25.331 referenced above and includes for example "UE measurement reporting and control of the reporting".

The UTRAN may control a measurement in the UE either by broadcast of system information and/or by transmitting a measurement control message. A measurement control message may be used to set up, modify or terminate a measurement by the UE and can include data including the following:

measurement type measurement objects, e.g. cells to be measured measurement reporting criteria, in particular whether reporting should be periodical or event-triggered One of the measurement types supported by the RRC protocol and of particular interest in embodiments of the present invention is the reporting of intra-frequency measurements by the UE. These are measurements on downlink physical channels at the same frequency as the current active set and in respect of a single network operator. A measurement object corresponds to one cell.

A UE which is connected and in dedicated mode performs measurements in relation to cells which fall into three mutually exclusive categories:

active set cells:

a cell or cells currently communicating with the UE in supporting a connection and known to the network. In UMTS, these cells are included by the UTRAN in a variable called "CELL_INFO_LIST"

monitored set cells:

non-active set cells nevertheless known to the network. In UMTS, these cells are included by the UTRAN in "CELL_INFO_LIST"

detected set cells:

cells detected by the UE, which are not known to the network. In UMTS, these cells are neither in CELL_INFO_LIST nor in the active set.

Measurements for detected set cells are only reported by the UE as intra-frequency measurements with the UE in a connected, dedicated state ("CELL_DCH") and are used by the UTRAN for example in configuring neighbour cell lists. Detected cells can potentially be added to "CELL_INFO_LIST", and to the active set cells, for subsequent monitoring, whereafter they will have become monitored or active set cells.

Cells to be measured can be specified in different ways by the UTRAN and will be appropriate to the action the UTRAN is contemplating. The UTRAN can specify that active set cells and/or monitored set cells and/or detected set cells should be measured. This is done differently for event-triggered and periodical reporting.

In event-triggered reporting, for some events it is the event description itself (as set out in Section 14.1.2 of TS 25.331 referenced above) that tells the UE which cells should be measured. For example, the description of "Event id" refers to active or non-active cells. For Events 1a, 1b, 1e and 1f, the UTRAN uses IEs called "Triggering condition 1" and "Triggering condition 2" (specified at Section 10.3.7.39 of TS 25.331) to tell the UE which cells should be measured.

In periodical reporting, the UTRAN uses a combination of reporting cell status (see Section 10.3.7.61 of TS 25.331) and reporting quantity (see Section 10.3.7.41 of TS 25.331) to tell the UE which cells to measure.

If active and/or monitored set cells are to be measured, the UE needs to know which cells they are. The default situation is that the UE will measure all of the cells listed by the UTRAN in CELL_INFO_LIST. The UTRAN may however specify a subset of these in a measurement control message by including an information element ("IE") called "Cells for measurement" where cells to be measured are specified by their scrambling codes.

If detected set cells are to be measured, there is no problem in identifying them to the UE since it is the UE which finds the detected set cells.

In event-triggered reporting, the UTRAN instructs the UE to make intra-frequency measurements of a specified kind by setting a value in the IE "Intra-frequency measurement quantity". The value that is set specifies the measurement that the UE will use in recognising an event. The measurements are generally intended to support continuous communication with the UE through changes in condition, such as movement of the UE or a drop in performance of a network access point. Event-triggered intra-frequency reports may cover any one of the following:

pathloss
received signal code power ("RSCP")
energy per chip
("Chip" in this context is used in known manner to indicate part of a communication protocol frame.)

In periodical reporting, the UTRAN can instruct the UE to report any or all of a set of cell reporting quantities listed at Section 10.3.7.5 of TS 25.331. This is done by setting the reporting indicator to "TRUE" for each measurement quantity to be reported. In this case, the IE "Intra-frequency measurement quantity" merely determines how the report results should be sorted.

Periodical and event-triggered measurement reporting criteria are mentioned above. Periodical reporting is simply done on a periodic basis, without conditions attached to the issue of each report. Event-triggered reporting, however, as its name suggests is triggered when a specified event occurs. It might be specified for example that a UE should report in respect of a cell when that cell surpasses another cell in a measured characteristic. Thus a cell that starts to deliver higher RSCP to the UE than an existing monitored set cell, because the UE has moved, may become a candidate for reporting to the UTRAN, triggered by the event that the RSCP for the new cell surpassed that for the existing monitored set cell. The report may or may not include actual measurement values for the cell concerned.

A potential problem arises if the UTRAN is capable of instructing measurements to be reported by the UE which the UE is simply not able to make. This problem can arise for example in respect of pathloss measurements. The UE measures pathloss by measuring the power of a cell's carrier signal received at the UE and subtracting it from the maximum power for the cell. The UE cannot itself measure the maximum power. It has to obtain the data from elsewhere and it does this, according to TS 25.331 referenced above, from the UTRAN. The UTRAN supplies maximum power data to the UE for every cell to be reported as long as the UTRAN has knowledge of the relevant cell(s). The UTRAN has knowledge of the active and monitored set cells but not of the detected set cells. Thus there is a problem where the UTRAN is capable of instructing pathloss measurements to be reported for detected set cells.

The UE is protected against certain circumstances. For example, it is capable of detecting that data is missing which it needs to receive in order to respond. If this is the case, the UE sets a variable "CONFIGURATION_INCOMPLETE" to "TRUE" and does not report measurements. Instead it sends a "MeasurementControlFailure" message back to the UTRAN. This occurs if the IE "measurement command" is set to "setup" and a further IE from a specified set of IEs is missing. For example, the UTRAN's measurement control message might fail to specify event parameters in the case of an event-triggered measurement. This is covered at Section 8.6.7.16 of TS 25.331.

The UE is also protected in the case of triggering events in which the UTRAN's measurement control message might instruct a pathloss measurement but the IE "Triggering condition 2" may potentially be set to include detected set cells. Two relevant triggering events are:

"Event 1$a$": a primary CPICH (common pilot channel) enters the reporting range
"Event 1$e$": a primary CPICH becomes better than an absolute threshold Terminology used herein, such as "primary CPICH", measurement quantities and the identity of an event, is intended to have the meanings set out in TS 25.331, together with supporting 3GPP documentation such as TR 21.905: "Vocabulary for 3GPP Specifications", or otherwise referred to in TS 25.331. Unless the context indicates otherwise, apparatus referred to herein will operate according to these specifications.

In general, the common pilot channel is used in UMTS to enable channel estimation. It is a physical channel that might be transmitted by two or more antennas (in the case of downlink transmit diversity). The primary CPICH uses a specific channelisation code and is assigned the primary scrambling code. It allows the UE to equalize the channel in order to achieve a phase reference with a synchronisation channel and also allows estimations in terms of power control. Secondary CPICHs are assigned a different combination of codes.

The UE detects the problem through the combination of the IE "Intra-frequency measurement quantity" being set to pathloss and Triggering condition 2 including detected set cells. It protects itself by setting the variable "CONFIGURATION_INCOMPLETE" to "TRUE" with respect to the relevant measurement control message and sending a "MeasurementControlFailure" message back to the UTRAN. This situation is covered at Section 8.6.7.16 of TS 25.331.

It is clear in the case of triggering events 1$a$ and 1$e$ in these circumstances that there may be a conflict. It is clear from the explicit combination of pathloss measurements and detected set cells. Further, the events themselves are relevant to cells that are likely to be detected set cells. That is, active and monitored set cells are already likely in practice to be above the absolute threshold and in a specified reporting range. However, it has now been recognised that these are not the only situations in which the UE is not, but needs to be, protected.

According to a first aspect of embodiments of the present invention, there is provided air interface management apparatus for use in network-based control of measurements made by mobile user equipment with respect to cells of the network, wherein the apparatus further comprises a conflict detector for detecting conflict in content of measurement control messages generated by the network to instruct user equipment to report pathloss measurement values for use in said control, said conflict detector being adapted to detect such conflict where said content specifies:

a) an identity for a triggering event for which the category or categories of cell to be measured is determined at the receiver solely by said identity and comprises detected set cells, or
b) periodical measurement in respect of a detected set cell.

That is in a) above, the category or categories of cell to be measured can be determined at the UE solely from a value in an IE which gives the UE the event identity. No further values are necessary for the UE to be fully instructed as to cell categories.

The relevant category or categories of cell, one or more of which might be determined, are those available under TS 25.331: active, monitored and detected set cells and subsets thereof.

Triggering events whose identity so determines a category or categories of cell to be measured which comprises detected set cells, described as Events 1c and 1d in TS 25.331, are a first event in which a non-active primary common pilot channel cell becomes better than an active primary common pilot channel cell, and a second event in which there is a change in best cell. Both of these events potentially occur for detected set cells and can therefore lead to the conflict the UE requires protection against.

The conflict detector may be adapted to detect only one of the cases set out in a) and b) above, or it may be adapted to detect all of them. In known equipment complying with current TS 25.331 (version 6.3.0), the user equipment is unprotected in each of these cases.

In the case of triggering events as described at "a)" above, it is much less clear that the unworkable combination of pathloss measurements and detected set cells arises than in the case of Events 1a and 1e mentioned above. Events 1a and 1e will show the explicit combination of Triggering condition 2 and the intra-frequency measurement quantity set to pathloss. Triggering events 1c and 1d in contrast do not use values for triggering conditions in the measurement control message and deal particularly with changes relative to the active set cells and best cells, neither of which relate at all closely to detected set cells. However, there are cases in which triggering events of the 1c and 1d type could cause pathloss measurements to be made for detected set cells. For example, the UTRAN could be unaware of a detected set cell because it is new and the UTRAN database has not been updated yet. For example, a cell may have come back "online" after equipment failure. A new detected set cell may nevertheless be strong and therefore should be reported to the UTRAN, particularly if it is better than an existing active set cell (Event 1c) or better than all the cells (Event 1d).

In the case of periodical measurements as set out at "b)" above, again it is a far less simple matter to detect that there is a potential conflict than in the case of triggering events of the types Event 1a and Event 1e. There are two information elements for which values present in the measurement control message may give rise to conflict. These are the "Reporting Cell Status" IE, described at Section 10.2.7.61 of TS 25.331, and the "Cell Reporting Quantities" IE, described at Section 10.2.7.5 of TS 25.331, these being mapped by the "Intra-frequency Reporting Quantity" IE, described at Section 10.3.7.41 of TS 25.331.

In a first arrangement, the apparatus may be adapted for installation in user equipment. In this case, it may for instance be associated with a receiver for receiving measurement control messages from the network for use in said control. In this arrangement, the apparatus may further comprise a conflict response mechanism adapted to block a response by the user equipment to a measurement control message associated with detected content.

In a second arrangement, the apparatus may be adapted for installation in the network. In this case, it may for instance be associated with a measurement control message generator. In this arrangement, the apparatus may further comprise a conflict response mechanism adapted to block transmission to the user equipment of a measurement control message associated with detected content.

Blocking by the conflict response mechanism may be done in respect of an entire detected measurement control message, by blocking transmission thereof or by blocking response thereto by the user equipment. Alternatively, blocking may comprise modifying content of either a detected measurement control message or a measurement report prepared in response thereto, to obviate a detected conflict. This latter alternative is preferred since it allows at least some measurements to be reported in respect of a detected measurement control message, rather than blocking all reporting in response to the message.

The use of a conflict detector according to an embodiment of the present invention allows the UE to be protected in several cases in which there is otherwise a potential problem where the UTRAN is capable of instructing pathloss measurements to be reported for detected set cells.

Triggering events relevant to embodiments of the present invention are described respectively as reporting events "1C" and "1D" at sections 14.1.2.3 and 14.1.2.4 of TS 25.331:

"Event 1c": A non-active primary CPICH becomes better than an active primary CPICH "Event 1d": Change of best cell The term "best cell" arises in the following example. When the UTRAN sends a measurement control message to the UE setting up or modifying periodical measurements, it may tell the UE what to measure for each relevant cell by putting values in an IE called "Reporting Quantity". The UE reports the measurements back to the UTRAN, as a list of cells and values for each quantity, in an IE called "Measured results" contained in measurement reports. For intra-frequency measurements, the list is then in the order of the value of the measurement quantity, the first cell listed being the "best cell". For example, in frequency division duplex signalling ("FDD") the best cell has the largest value when the measurement quantity is the energy per chip ("Ec/No") or RSCP. On the other hand, the best cell has the smallest value when the measurement quantity is "Pathloss".

In a second aspect of embodiments of the present invention, there is provided a method of managing an air interface for use in network-based control of measurements made by mobile user equipment with respect to cells of the network, said method comprising the steps of:

i) monitoring content or potential content of measurement control messages for transmission from the network to the user equipment;

ii) detecting conflict in said content; and iii) blocking transmission of, or response to, a detected measurement control message, wherein said conflict is detected where the content or potential content specifies:

a) an identity for a triggering event for which the category or categories of cell to be measured is determined at the receiver solely by said identity and comprises detected set cells, or b) periodical measurement in respect of a detected set cell.

Further advantageous features of embodiments of the present invention are described in the following description of embodiments of the present invention and/or set out in the claims appended hereto.

Air interface management apparatus for use in user equipment according to an embodiment of the present invention will now be described, by way of example only, with reference to the following figures in which.

Referring to FIG. 1 and as described above, a UMTS cellular network usually has two primary parts, the UTRAN 100 and the core network 105. The UTRAN 100 looks after the physical aspects of providing wireless access for a mobile UE 130 to the core network 105 and the core network provides switching. The UTRAN 100 and the core network communicate with each other via an interface known as the "$I_u$" 110.

The UTRAN 100 is made up of a set of RNSs ("Radio Network Subsystems"). Each RNS comprises a RNC ("Radio Network Controller") 115 and one or more logical nodes known as "Node Bs" 120. The RNC 115 provides functionality similar to the base station controller in GSM ("Global System for Mobile communication") networks and each Node B 120 is the access point of a cell 125, equivalent to the base station in GSM networks. The interfaces between these various pieces of equipment are known as follows:

RNC 115-RNC 115: "$I_{ur}$"
RNC 115-Node B 120: "$I_{ub}$"
Node B 120-UE 130: "$U_u$"

Figure 2:
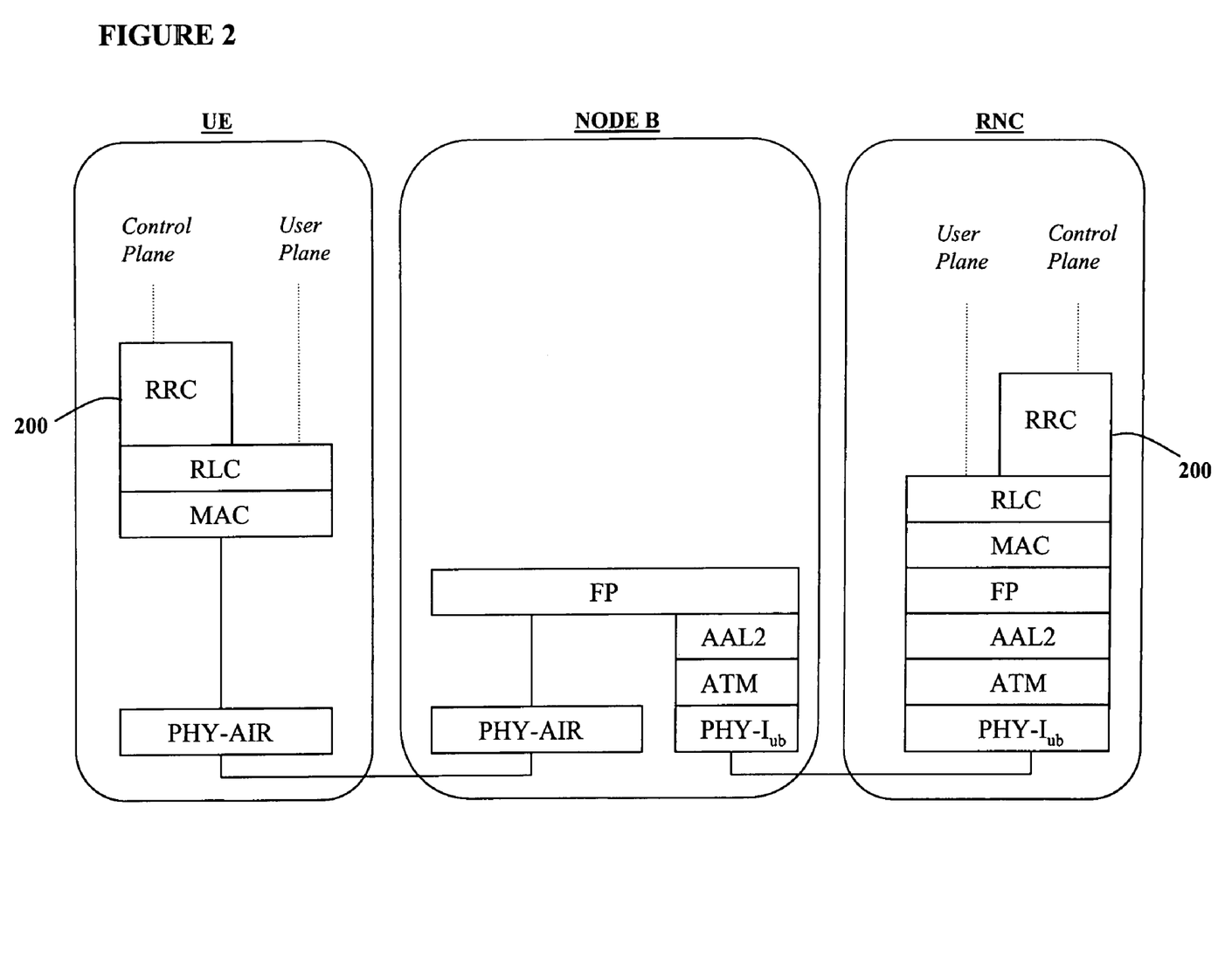
FIG. 2 shows a schematic block diagram of protocol stacks that might be present in relation to the network of FIG. 1 to support the air interface management apparatus.

Referring to FIG. 2, standardised protocol stacks have been developed for use in a UMTS-compatible UE 130 and in the UTRAN 100. Published technical specifications are available to describe these, including TS 25.331 mentioned above. Entities built according to the RRC protocol 200 will be present in the UE 130 and the RNC 115. The Node B 120 has no functions to which the protocol is relevant. In the protocol stacks of the UE 130 and the UTRAN 100, the RRC 200 sits in the control plane only, just above the Radio Link Control ("RLC") protocol. That is, only control data will be subject to the RRC protocol 200.

Embodiment 1: Conflict Resolution at the UE 130

Figure 3:
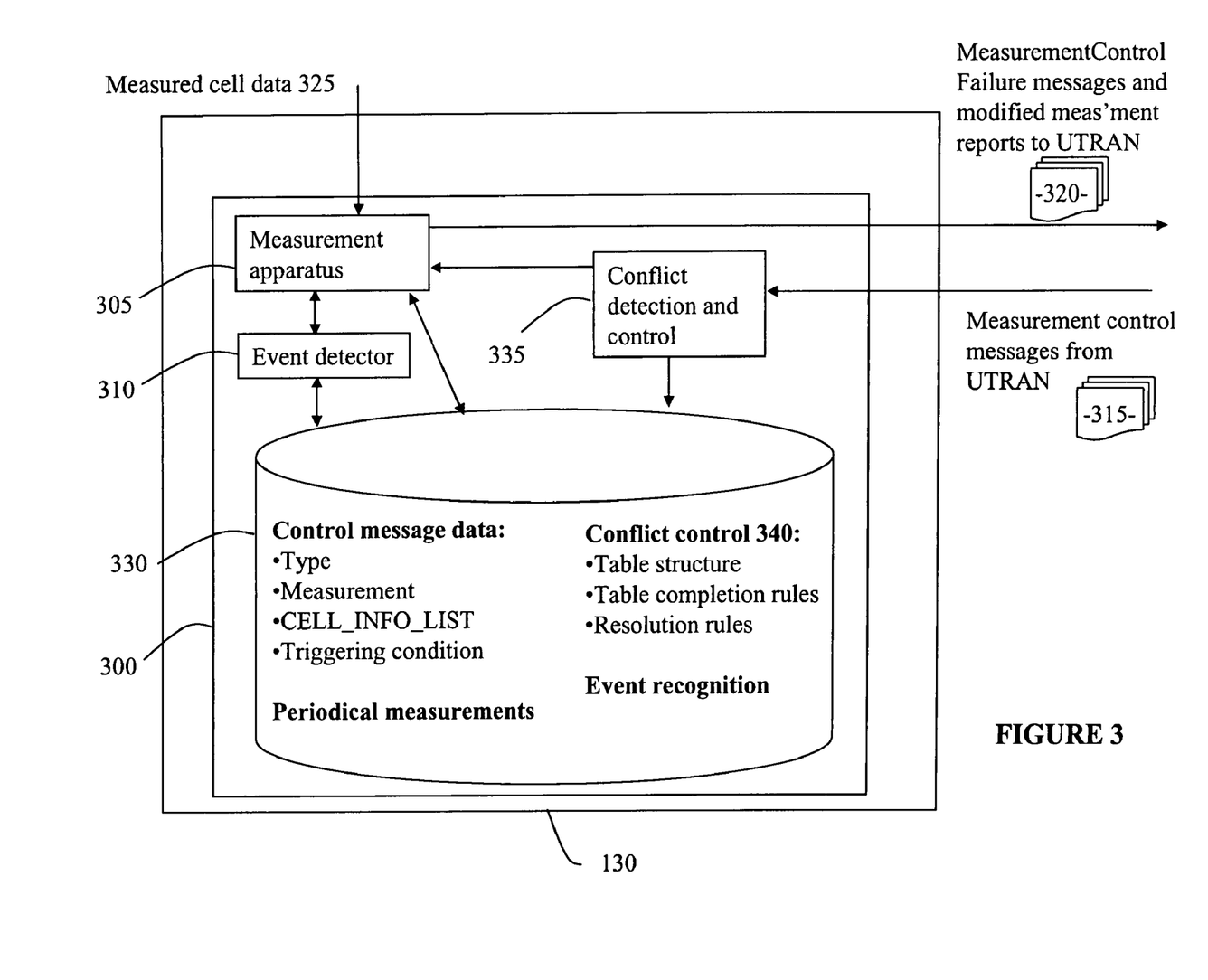
FIG. 3 shows a functional block diagram of components of the air interface management apparatus present in a UE for use with the network of FIG. 1.

Referring to FIG. 3, in a first embodiment of the present invention, the UE 130 has air interface management apparatus 300 installed which comprises the following functional blocks:

Measurement apparatus 305 for receiving measurement control messages 315 from the UTRAN 100, making appropriate periodic and event-triggered measurements and delivering measurement (or "MeasurementControlFailure") reports 320 to the UTRAN 100;

Event detector 310 for processing measured cell data 325 gathered by periodic measurements in order to detect an event which necessitates one or more event-triggered measurements; and Conflict detection and control 335 for processing incoming measurement control messages 315 in order to detect and resolve a conflict between the content of different IEs thereof.

Data in support of these functional blocks is stored in a data store 330 of the UE 130. This data falls into four categories: the content of current measurement control messages 315; measured values for current periodical measurements; rules for conflict recognition and control; and event recognition.

Content of Current Measurement Control Messages 315

3GPP specifications define a global variable in this respect, "Measurement_Identity", set out as described in Section 13.4.12 of TS 25.331. This variable stores the measurements configured in the UE 130. The information is stored directly from incoming measurement control messages (and may further contain information delivered to the user equipment in "System Information Blocks" ("SIBS")). The UE 130 then only needs to know whether a measurement is periodic, or which event is relevant, to know which IE to read.

Measured Values

In connected CELL_DCH state, in the absence of instruction from the UTRAN 100, the UE 130 will be scanning for cells as a background activity. That is, it will be making a limited set of measurements but the measured values are not reported to the UTRAN 100. The UTRAN 100 sends a measurement control message to instruct the UE 130 to make specified measurements and to report specified values and/or events obtained from the measurements.

A measurement control message may instruct simple periodical reporting, for instance for planning purposes. The periodical report may go out every second say, but there may be a number of values measured by the UE 130 during this time. The values are filtered as set out in Section 8.6.7.2 of TS 25.331 and so the value reported to the UTRAN 100 in the measurement report may be influenced by previous measurements. The measured values are stored at the UE 130, for instance to give a degree of rollback in case of failure somewhere in the system and also so that an event may be detected.

If a measurement control message has instructed event-triggered reporting, periodical measurements are still necessary in order to detect events. The measured values for these periodical measurements need to be stored and then evaluated by the event detector 310 of the UE 130 in order to detect events, such as measured values for one cell surpassing those of another. Although these periodically measured values are stored, they are not reported to the UTRAN 100. When an event occurs which has been specified in a measurement control message 315, then it is the event that is reported rather than the periodical measurements. The UE 130 sends a report containing the event identifier (1a or 1c etc) and the relevant cell scrambling codes. It may not necessarily include any actual measurements although the UTRAN 100 may specify that it should. If the UTRAN 100 does so specify, the UE 130 would also include the "MeasuredResults" IE in the event report.

Rules for Conflict Recognition and Control

The rules for operation of the conflict recognition and control function 335 may be expressed in various different software techniques but the functions will be as follows. A conflict between values for IEs in an incoming measurement control message 315 ("setup" or "modify") needs to be both recognised and dealt with. Thus rules might be provided firstly for use in processing values in incoming measurement control messages so as to construct the following table ("Table 1") and then to detect potentially conflicting values by evaluating the table:

TABLE 1

Requirement for Pathloss Measurements against Detected Set Cells

|  | Active Set Cells | Monitored Set Cells | Detected Set Cells |
|---|---|---|---|
| Periodic | 1 | 1 | 1* |
| Event 1a | 1 | 1 | 1 |
| Event 1b | 1 | 1 | 0 |
| Event 1c | 1 | 1 | 1* |
| Event 1d | 1 | 1 | 1* |
| Event 1e | 1 | 1 | 1 |
| Event 1f | 1 | 1 | 0 |

The problem only arises with pathloss measurements and the table only therefore carries data for measurement control messages where the IE "Intra-frequency measurement quantity" is set to "pathloss" for event-triggered reporting and the pathloss reporting indicator is set to "TRUE" for detected set cells for periodical reporting. To evaluate the table, a rule may simply look for the problem arising where a "1" appears in the Detected Set Cell column against periodic, Event 1c or Event 1d type measurements, as starred in Table 1.

Conflict Detection and Control Function 335

(The measurement apparatus 305 and the event detector 310 operate in known manner and are not therefore further described herein.)

Rules stored in the data store 330 for use in completing and evaluating the table will in practice be run by processes of the conflict detection and control function 335.

Once a problem has been detected, using a mechanism such as Table 1, there is more than one way of dealing with it.

In a first approach to controlling conflict, response by the UE 130 to a detected measurement control message is blocked entirely. This can be done using a known mechanism of the UE 130 in which the UE 130 sets a variable "CONFIGURATION_INCOMPLETE" to "TRUE" and does not report measurements. Instead it sends a "MeasurementControlFailure" report 320.

In a second approach, the UE 130 might accept the measurement control message but only apply it to active and/or monitored set cells. To enable this, the conflict detection and control function 335 needs to modify the effect of the measurement control message by effectively inserting a filter to filter out detected set cells before the UE 130 makes the appropriate measurements. Detected set cells are of course known and identified at the UE 130 by being absent from "CELL_INFO_LIST", making such a filter simple to implement.

In the case of periodical measurements, the measurement control message specifies the measurements required for detected set cells separately from active and monitored set cells, as set out in Section 10.3.7.41 of TS 25.331. If the pathloss reporting indicator is set to "TRUE" in a received measurement control message, the conflict detection and control function 335 can selectively block reports on pathloss measurements for detected cell sets by substituting a value "FALSE" for the pathloss reporting indicator as stored in the data store 330.

Embodiment 2: Conflict Resolution in the UTRAN 100

Figure 4:
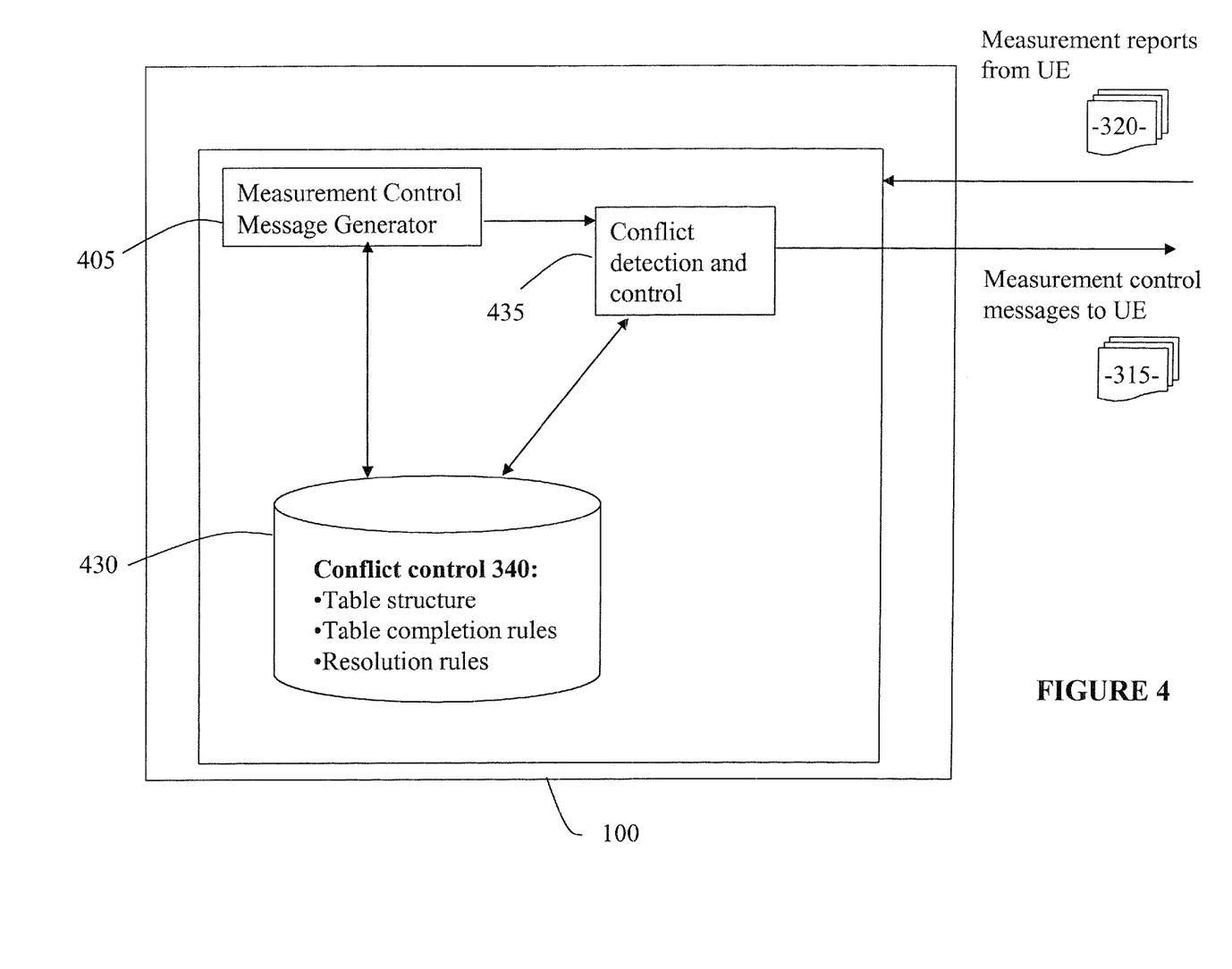
FIG. 4 shows a functional block diagram of components of the air interface management apparatus present in the UTRAN for use in the network of FIG. 1.

Referring to FIG. 4, potential conflict can instead be dealt with in the UTRAN 100. In this case, a conflict detection and control function 435 sits next to the measurement control message generator 405 and monitors generated messages prior to transmission. In this arrangement, the same conflict control data 340 and detection methods are used but instead of blocking responses at the UE 130, the measurement control messages 315 are stopped or modified prior to transmission.

Conflict Detection and Control Function 335, 435

Figure 5:
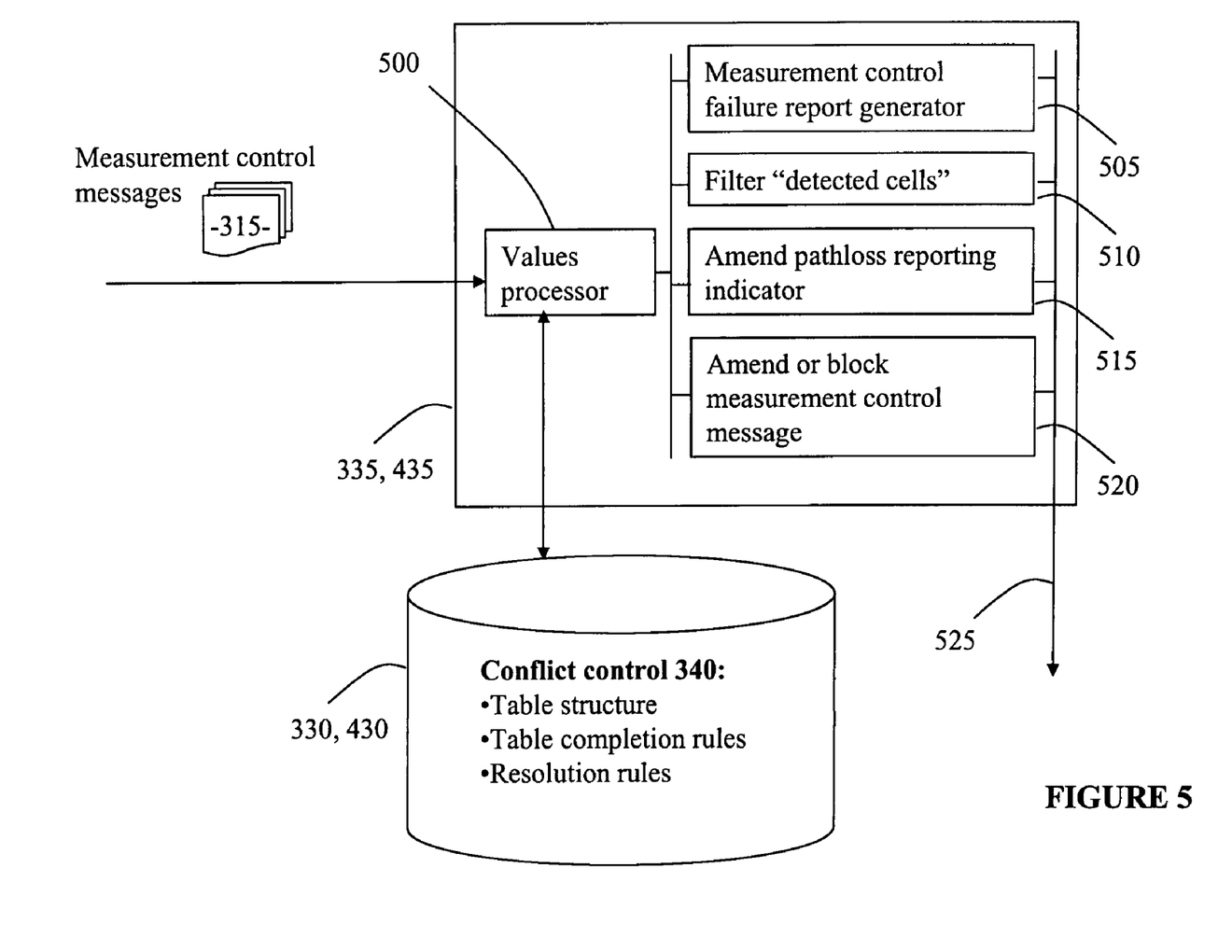
FIG. 5 shows a functional block diagram of components of a conflict detector for use in air interface management apparatus suitable for use in association with either the UTRAN or the UE.

Referring to FIGS. 4 and 5, a conflict detector 335, 435 for use at either the UTRAN 100 or the UE 130 comprises an input to a values processor 500 for measurement control messages 315 either prior to transmission from the UTRAN 100 or on receipt at the UE 130. The values processor 500 constructs a requirements table according to Table 1 above, using a table structure and completion rules for processing values from a measurement control message 315 into the table structure stored in a data store 330, 430 either at the UTRAN 100 or the UE 130. If the completed table indicates conflict, the conflict detector 335, 435 triggers an appropriate resolution, using resolution rules stored in the data store 330, 430. The appropriate resolution mechanism may be any of the approaches described above, using:

- a measurement control failure report generator 505 according to existing known UE technology
- a filter 510 to tell the UE 130 to filter out detected cells prior to applying a received measurement control message 315
- an indicator amendment mechanism 515 to overwrite a value "TRUE" to "FALSE" for the relevant pathloss reporting indicator. This might be done at either the UTRAN 100 or the UE 130
- a measurement control message amendment or blocking mechanism 520 to tell the UTRAN 100 to amend or block a measurement control message 315 prior to transmission The conflict detector 335, 435 therefore has an input to the values processor 500 for measurement control messages 315 and an output 525 for communicating with the UTRAN 100 or the UE 130 to resolve a detected conflict, via one of the mechanisms listed above.

Message Flow: Event Type 1C

In use of a working embodiment of the present invention to detect event type 1C, the following sequence of message transfers might take place:

UTRAN UE CELLs
    ------> Reconfiguration (Cell_DCH, active set {Cell A})
    ------> MeasurementControl (event 1C, RSCP, cell info: A;B)
    <------ cell A=−110 dBm, Cell B=−52 dBm>
    <----- MeasurementReport (event 1C, cells {B,A})
    <------ <cell C is detected>
    <----- <cell A=−112 dBm, Cell B=−63 dBm, Cell C=−33 dBm>
    <----- MeasurementReport (event 1C, cells {C,B,A})

UTRAN UE CELLs Active set={cell A}
    ------> Reconfiguration (Cell_DCH, active set {Cell A})
    ------> MeasurementControl (event 1C, pathloss, cell info: A;B)
    <----- MeasurementControlFailure (INCOMPLETE_CONFIGURATION)

Message Flow: Event Type 1D

In use of a working embodiment of the present invention to detect event type 1D, the following sequence of message transfers might take place:

UTRAN UE CELLs
 ------> Reconfiguration (Cell_DCH, active set {Cell A})
 ------> MeasurementControl (event 1D, RSCP, cell info: A;B)
  <------ cell A=-110 dBm, Cell B=-52 dBm>
 <------ MeasurementReport (event 1D, cell {B})
  <------ <cell C is detected>
 <------ <cell A=-112 dBm, Cell B=-63 dBm, Cell C=-33 dBm>
 <----- MeasurementReport (event 1D, cell {C})

UTRAN UE CELLs
 ------> Reconfiguration (Cell_DCH, active set {Cell A})
 ------> MeasurementControl (event 1D, pathloss, cell info: A;B)
 <----- MeasurementControlFailure (INCOMPLETE_CONFIGURATION)

It can be seen that the message flow in this case is similar to that for the Event 1c case but the measurement report is different.

Message Flow: Periodic Reporting

In use of a working embodiment of the present invention to provide periodic measurement reporting, the following sequence of message transfers might take place:

UTRAN UE CELLs
 ------> Reconfiguration (Cell_DCH, active set {Cell A})
 ------> MeasurementControl (periodic, pathloss, active and monitored set cells)
  <------ <cell A=-110 dBm, Cell B=-52 dBm>
  <------ <cell A=-112 dBm, Cell B=-63 dBm>
  <------ <cell A=-109 dBm, Cell B=-74 dBm>
  <------ <cell A=-101 dBm, Cell B=-76 dBm>
 <----- MeasurementReport (cell A=130, Cell B=46)
  <------ <cell A=-110 dBm, Cell B=-52 dBm>
  <------ <cell C is detected>
  <------ <cell A=-112 dBm, Cell B=-63 dBm, Cell C=-33 dBm>
  <------ <cell A=-113 dBm, Cell B=-64 dBm, Cell C=-43 dBm>
  <------ <cell A=-112 dBm, Cell B=-62 dBm, Cell C=-45 dBm>
 <----- MeasurementReport (cell A=132, Cell B=48)

In the above, the UTRAN 100 has only specified the measurement quantity "pathloss". It would be possible that it should specify other measurement quantities in the same report. In that case, the measurement report in the last line above might in practice include "Cell C" but only in respect of the other measurement quantities.

The invention claimed is:

1. Air interface management apparatus for use in network-based control of measurements made by mobile user equipment with respect to cells of the network, said cells each having an associated category,
 wherein the apparatus further comprises a conflict detector for detecting conflict in content of measurement control messages generated by the network to instruct user equipment to report pathloss measurement values for use in said control,
 said conflict detector being adapted to detect such conflict where said content specifies:
 an identity for a triggering event for which the category or categories of cell to be measured is determined solely by said identity and comprises detected set cells, or
 periodical measurement in respect of a detected set cell.

2. Apparatus according to claim 1 wherein the apparatus further comprises a receiver for receiving measurement control messages from the network for use in said control.

3. Apparatus according to claim 1 wherein the apparatus further comprises a generator for generating measurement control messages from the network for use in said control.

4. Apparatus according to claim 1 wherein a triggering event whose identity is specified by said content comprises a non-active primary common pilot channel cell becoming better than an active primary common pilot channel cell.

5. Apparatus according to claim 1 wherein a triggering event whose identity is specified by said content comprises a change in best cell.

6. Apparatus according to claim 1, the apparatus further comprising a conflict response mechanism for responding to a detected conflict.

7. Apparatus according to claim 6, wherein said conflict response mechanism is adapted to block the report of measurements by the user equipment to the network in response to a detected conflict.

8. Apparatus according to claim 7 wherein said blocking comprises blocking report of measurements by the user equipment in respect of an entire detected measurement control message.

9. Apparatus according to claim 7 wherein said blocking comprises blocking report of one or more selected measurements by the user equipment in response to a detected measurement control message.

10. Apparatus according to claim 7, wherein said conflict response mechanism is adapted to block the transmission of a measurement control messages by the network to the user equipment in response to a detected conflict.

11. Apparatus according to claim 10 wherein said blocking comprises blocking transmission of an entire detected measurement control message.

12. Apparatus according to claim 10 wherein said blocking comprises blocking instruction of one or more selected measurements by the user equipment in a detected measurement control message.

13. A method of managing an air interface for use in network-based control of measurements made by mobile user equipment with respect to cells of the network, said method comprising the steps of:
 monitoring content of measurement control messages for transmission from the network to the user equipment;
 detecting conflict in said content; and
 blocking transmission of, or response to, a measurement control message giving rise to a detected conflict,
 wherein said conflict is detected where the content specifies:
 an identity for a triggering event for which the category or categories of cell to be measured is determined solely by said identity and comprises detected set cells, or
 periodical measurement in respect of a detected set cell.

14. A method according to claim 13 further comprising the step of blocking the report of measurements by the user equipment to the network in response to a measurement control message giving rise to a detected conflict.

15. A method according to claim 13 further comprising the step of blocking the report of one or more selected measurements by the user equipment to the network in response to a measurement control message giving rise to a detected conflict.

16. A method according to claim 13 further comprising the step of blocking the transmission by the network to the user equipment of a measurement control message giving rise to a detected conflict.

17. A method according to claim 13 further comprising the step of modifying the content of a measurement control message giving rise to a detected conflict prior to transmission by the network to the user equipment.

* * * * *